(12) United States Patent
Chow et al.

(10) Patent No.: US 9,437,120 B2
(45) Date of Patent: Sep. 6, 2016

(54) INTERACTIVE CUSTOM REGIONS

(75) Inventors: Kevin Chow, Wakefield, MA (US);
Prashant Singh, Burlington, MA (US);
Melinda Tang, Cambridge, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 518 days.

(21) Appl. No.: 13/297,642

(22) Filed: Nov. 16, 2011

(65) Prior Publication Data

US 2012/0297327 A1    Nov. 22, 2012

Related U.S. Application Data

(60) Provisional application No. 61/487,856, filed on May 19, 2011.

(51) Int. Cl.
*G06F 3/048* (2013.01)
*G09B 29/00* (2006.01)
*G06F 9/44* (2006.01)

(52) U.S. Cl.
CPC .......... *G09B 29/007* (2013.01); *G06F 9/4443* (2013.01)

(58) Field of Classification Search
CPC .......... C12Q 1/6855; C12Q 2521/307; C12Q 2525/101; C12Q 2525/191; C12Q 2537/143; C12Q 1/6806; C12Q 1/686; C12Q 1/6886; C12Q 2600/16; C12Q 2537/16; C12Q 1/6883; C12Q 2600/106; C12Q 2600/136; G06F 3/0482; G06F 3/04842; G06F 3/0488; G06F 3/04845; G06F 3/0481; G06F 3/0486; G06F 3/04883; G06F 3/04812; G06F 3/04817; G06F 3/04847; G06F 3/0485; G06F 3/04886
USPC ................................... 715/744, 759
See application file for complete search history.

(56) References Cited

U.S. PATENT DOCUMENTS

| | | | |
|---|---|---|---|
| 7,380,202 B1 * | 5/2008 | Lindhorst et al. ............ 715/204 |
| 8,555,315 B2 * | 10/2013 | Woods et al. ................... 725/43 |
| 2004/0138913 A1 * | 7/2004 | Guerra .............................. 705/1 |
| 2009/0012865 A1 * | 1/2009 | Celik .............................. 705/14 |
| 2009/0187862 A1 * | 7/2009 | DaCosta ....................... 715/836 |
| 2009/0249217 A1 * | 10/2009 | Narayanaswami ........... 715/744 |
| 2012/0062566 A1 * | 3/2012 | Kuhne .......................... 345/426 |

OTHER PUBLICATIONS

Sheppard Software, USA Map Jigsaw Games (Aug. 10, 2008). http://web.archive.org/web/20080921220708/http://www.sheppardsoftware.com/USA_Geography/relief_games/USA_map_jigsaw_game_1.html.*

* cited by examiner

*Primary Examiner* — Di Xiao (74) *Attorney, Agent, or Firm* — Miles & Stockbridge PC (57) ABSTRACT

One embodiment is directed to a computer program, embodied on a computer readable medium. The computer program is configured to control a processor to execute instructions. The instructions include receiving a selection of built-in interactive regions provided by a visualization component, aggregating the selected set of regions, and creating one or more custom regions from the aggregation of the selected set of regions.

21 Claims, 8 Drawing Sheets

INTERACTIVE CUSTOM REGIONS

CROSS REFERENCE TO RELATED APPLICATIONS

This application claims priority from provisional application Ser. No. 61/487,856, filed on May 19, 2011, the contents of which is hereby incorporated by reference in its entirety.

FIELD

One embodiment is directed generally to a computer system, and in particular to a system for creating interactive custom regions in a visualization component.

BACKGROUND INFORMATION

Visualization components include components or interfaces for applications that allow users, such as software developers, to visualize and display data in meaningful ways. Many visualization components have built-in, interactive regions with which software developers can stylize based on the data. Mapping components are one example of a visualization component that may include existing, built-in regions. However, these visualization components typically do not allow developers to easily group the existing regions into an aggregated region. In the case of mapping components, for instance, developers are not able to group certain states to form a region. For example, developers cannot easily group California, Oregon, and Washington states into a larger region called "West." Another limitation of existing visualization components is that they typically force users to work with non-visual forms of the territories, such as tables and trees.

SUMMARY

One embodiment is directed to a computer program, embodied on a computer readable medium. The computer program is configured to control a processor to execute instructions. The instructions include receiving a selection of interactive regions from a user. The interactive regions are selected from among a set of built-in interactive regions provided by a visualization component. The instructions further include aggregating the selected set of built-in interactive regions, and creating at least one custom region from the aggregation of the selected set of built-in interactive regions.

DETAILED DESCRIPTION

One embodiment is directed to a visualization component that is configured to receive a set of interactive regions. The set of interactive regions may be selected from among a set of existing, built-in regions that are provided by the visualization component. The visualization component may then aggregate the selected set of built-in regions, and create a new custom interactive region that is the aggregate of the selected set of regions.

Figure 1:
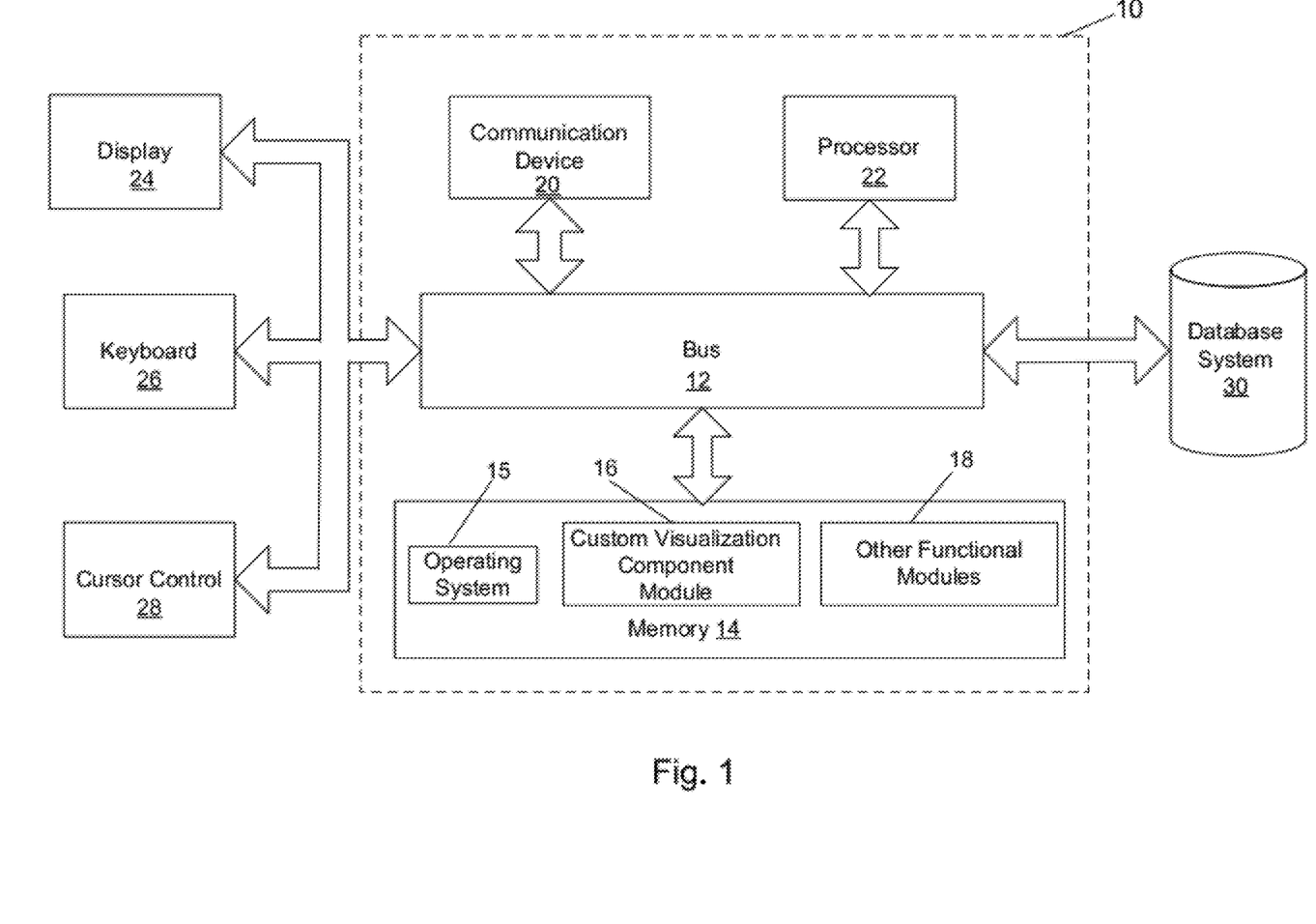
FIG. 1 illustrates a system according to one embodiment of the invention.

FIG. 1 illustrates a block diagram of a system 10 configured to create a custom region, according to one embodiment. System 10 includes a bus 12 or other communications mechanism for communicating information between components of system 10. Alternatively, the components of system 10 may communicate with each other directly without the use of bus 12.

System 10 also includes a processor 22, coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer readable media. System 10 further includes a communication device 20, such as a network interface card or other communications interface, to provide access to a network. As a result, a user may interface with system 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information or data to a user, such as maps or diagrams, as will be discussed in more detail below. A keyboard 26 and a cursor control device 28, such as a computer mouse, are further coupled to bus 12 to enable a user to interface with system 10.

Processor 22 and memory 14 may also be coupled via bus 12 to a database system 30 and, thus, may be able to access and retrieve information stored in database system 30. Although only a single database is illustrated in FIG. 1, any number of databases may be used in accordance with certain embodiments. In some embodiments, database system 30 may store information related to displayed maps or regions, such as their dimensions, area, coordinates, and any other relevant attributes.

In one embodiment, memory 14 stores software modules that provide functionality when executed by processor 22. The modules may include an operating system 15 that provides operating system functionality for system 10. The memory may also store a custom visualization component module 16, which can provide the functionality for creating a custom region, according to one embodiment. System 10 may also include one or more other functional modules 18 to provide additional functionality.

Database system 30 may include a database server and any type of database, such as a relational or flat file database. Database system 30 may store attributes related to the maps or regions. Database system 30 may also store any other data required by the custom visualization component module 16, or data associated with system 10 and its associated modules and components.

In certain embodiments, custom visualization component module 16, and other functional modules 18 may be implemented as separate physical and logical units or may be implemented in a single physical and logical unit. Furthermore, in some embodiments, custom visualization component module 16, and other functional modules 18 may be implemented in hardware, or as any suitable combination of hardware and software.

In one embodiment, custom visualization component module 16 is configured to control system 10 to perform a process of creating one or more interactive custom regions in a map or diagram. According to certain embodiments, custom visualization component module 16 is configured to receive a selection of a set of built-in interactive regions provided by custom visualization component module 16. Custom visualization component module 16 may then be configured to aggregate the selected regions and create a new custom interactive region that is the aggregate of the selected regions. The newly created custom region functions like any of the built-in regions and users can use or interact with the custom regions as they would with the built-in regions. For example, the new custom region can be used to show data as well as display markers and images. Custom visualization component module 16 can also be configured to allow for drilling down to view the individual regions that make up that custom region.

In certain embodiments, custom visualization component module 16 includes a receiver configured to receive the selection of built-in interactive regions provided by a visualization component, an aggregating unit configured to aggregate the selected set of regions, and a creating unit configured to create at least one custom region from the aggregation of the selected set of regions.

FIGS. 2a-2e illustrate examples of an interactive custom region applied to a map of the United States, according to one embodiment. It should be noted that embodiments of the invention are not limited to such maps, but can be applied to maps of other regions, as well as other types of charts, graphs, or visual depictions of data.

Figure 2A:
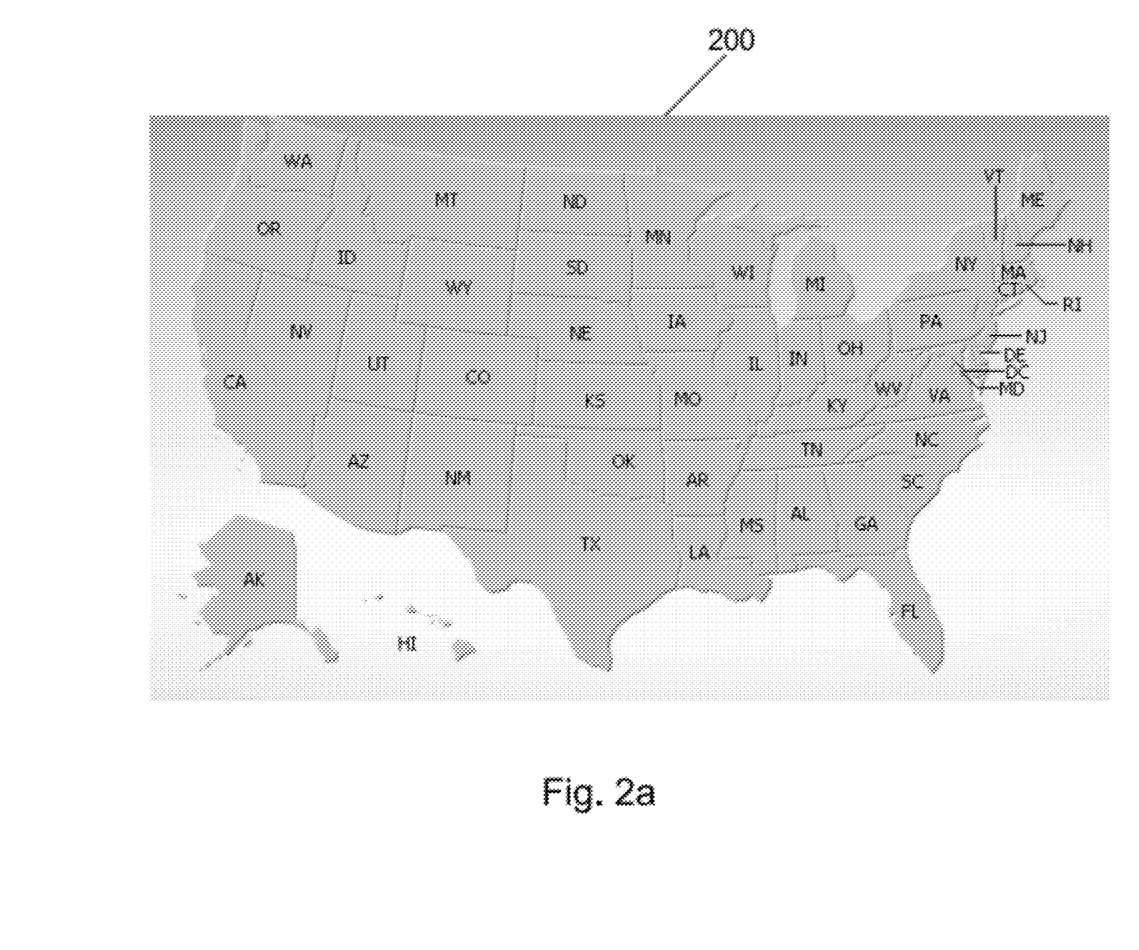
FIG. 2a illustrates an example of an interactive map according to an embodiment.
Figure 2B:
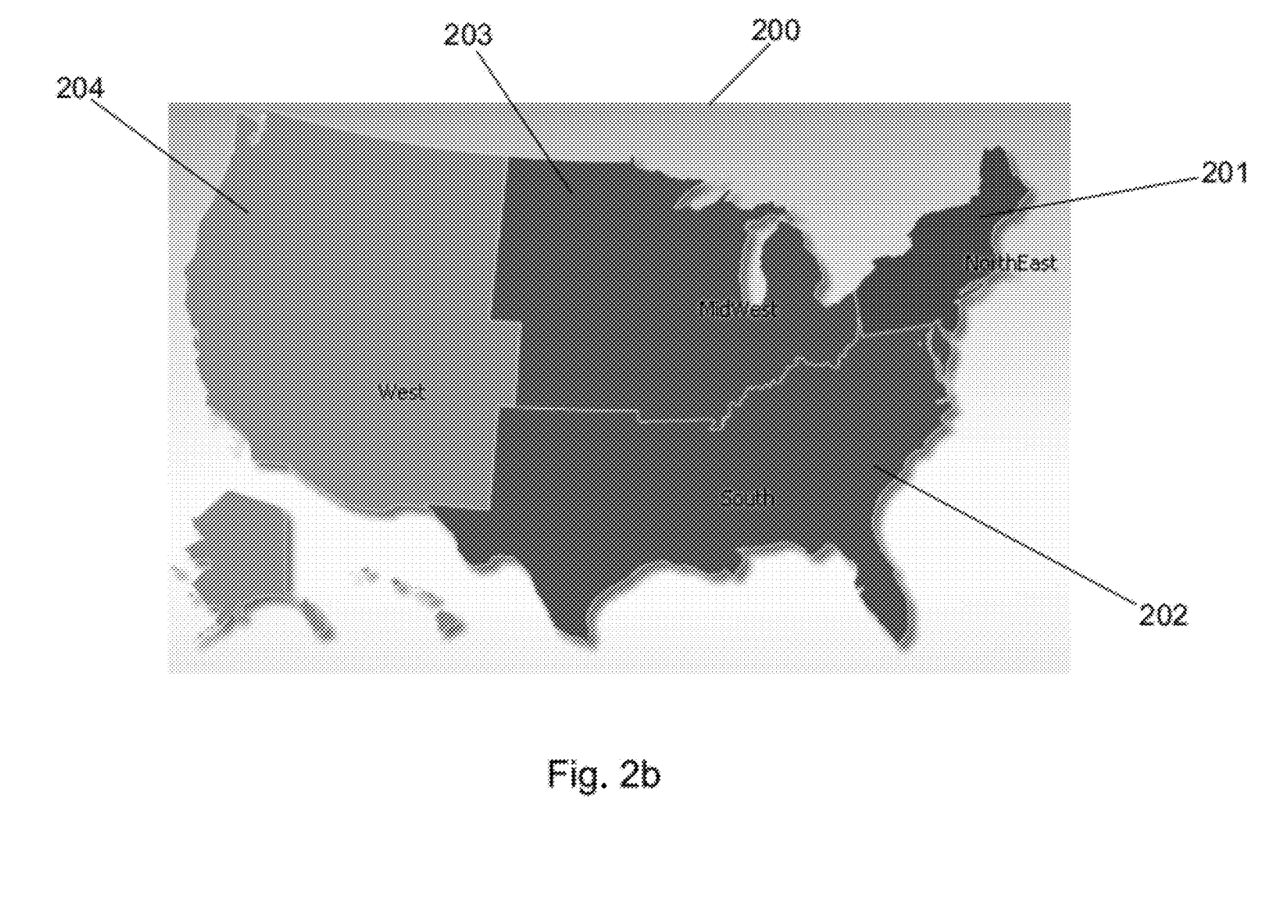
FIG. 2b illustrates an example of an interactive map according to another embodiment.

FIG. 2a illustrates a map 200 of the United States showing and labeling each of the states. FIG. 2b illustrates a map 200 of the United States in which a custom region layer has been created with four regions: Northeast 201, South 202, Midwest 203, and West 204. In this embodiment, each region aggregates a number of states such that: Northeast 201 includes ME, NH, VT, MA, RI, CT, NY, PA, NJ; South 202 includes DE, MD, VA, DC, WV, NC, SC, GA, FL, KY, IN, MS, AL, OK, TX, AR, LA; Midwest 203 includes WI, MI, IL, IN, SD, NE, KS, MN, IA, MO, and West 204 includes ID, MT, WY, NV, VT, CO, AZ, NM, AK, WA, OR, CA, HI. In one embodiment, each of the custom regions 201, 202, 203, 204 may be labeled and applied with formatting, such as being displayed in different colors.

In one embodiment, a custom map layer, such as a custom region layer, can be defined from regional data and inserted into the natural geographical hierarchy of a thematic map, for example. The custom layer can be created by extending a predefined map layer and aggregating the lower level regions to form the new regions in the custom layer. After defining a custom map layer, it can be used in the same manner as any other map layer. For instance, geographical regions for the Northeast 201, South 202, Midwest 203, and West 204 can be created as a U.S. regions custom map layer, as discussed above. The U.S. regions custom layer is extended from the states layer in the U.S. base map illustrated in FIG. 2a. The new areas in the layer are aggregated from the states in the states layer.

According to certain embodiments, each custom region, although formed by aggregating multiple states, is treated as an individual region. Each custom region can be formatted, such as applying coloring and labeling, similar to other non-custom regions on the map. Labels can be applied to the custom region as a whole.

Figure 2C:
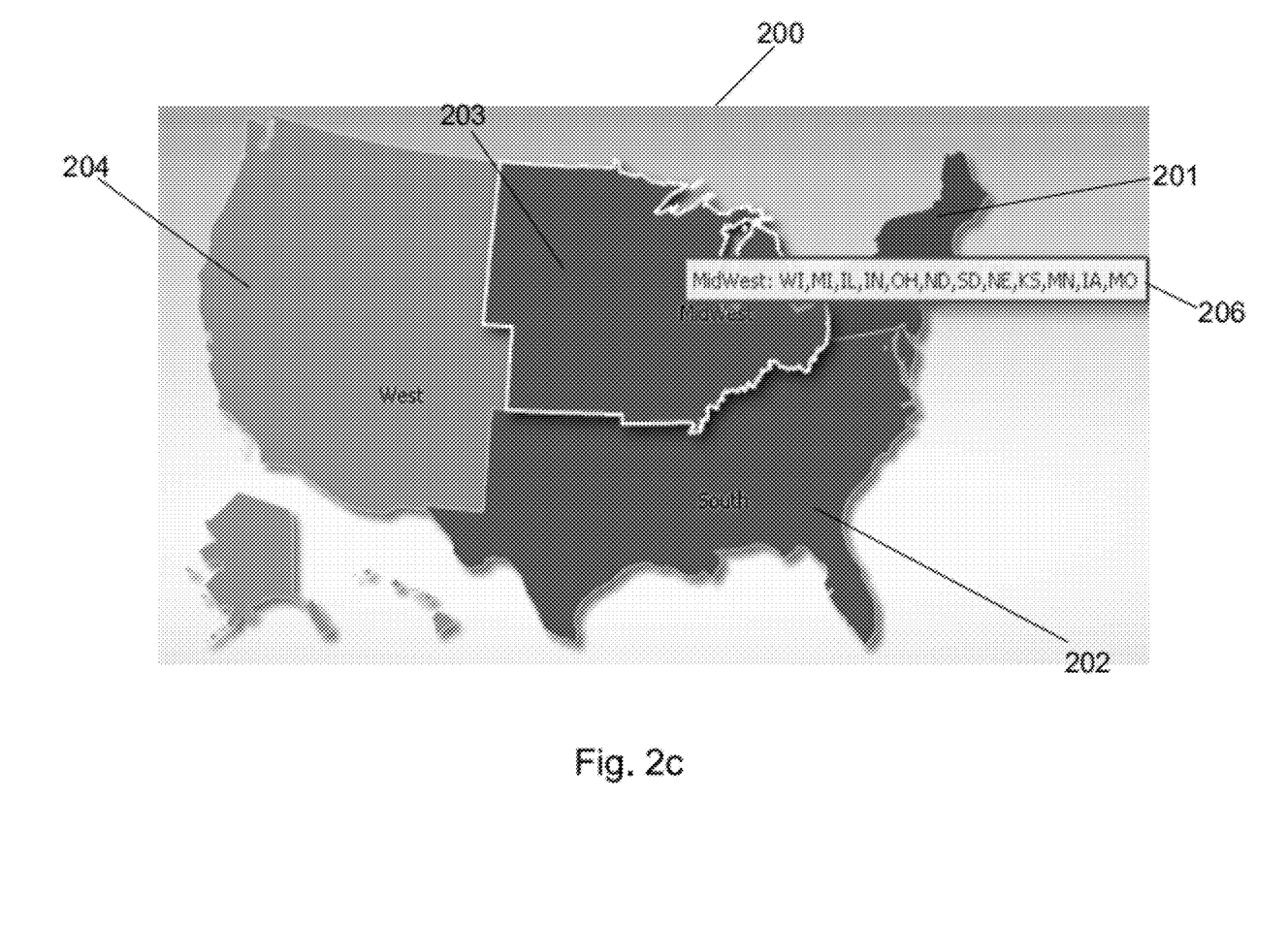
FIG. 2c illustrates an example of an interactive map according to another embodiment.

FIG. 2c illustrates an example of a map 200 with the four custom regions, Northeast 201, South 202, Midwest 203, and West 204. In one embodiment, a user can select a region to highlight that region, and/or mouse over a region to see the tooltip for that region. A user may select a region by moving the cursor over that region, and clicking the cursor control device or tapping a touchscreen or touchpad, for example. As illustrated in FIG. 2c, Midwest region 203 has been selected and, as a result, is highlighted and elevated with respect to the other regions 201, 202, 204. In addition, a tooltip 206 for Midwest 203 is displayed. Tooltip 206 shows the name of the region followed by the states or sub-regions included within that region. In this example, tooltip 206 shows "Midwest: WI, MI, IL, IN, SD, NE, KS, MN, IA, MO." Selecting or moving the cursor over other regions will similarly show tooltips corresponding to those regions.

Figure 2D:
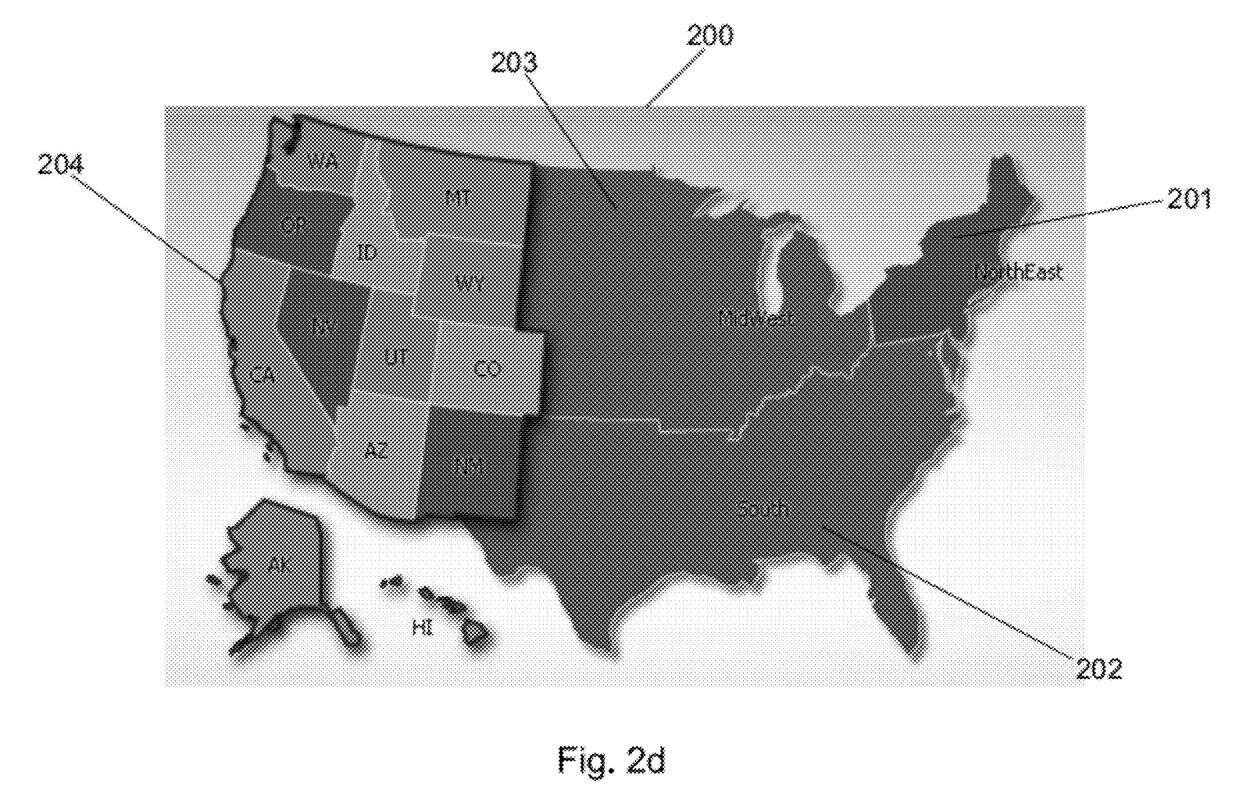
FIG. 2d illustrates an example of an interactive map according to another embodiment.

FIG. 2d again illustrates an example of a map 200 with the four custom regions, Northeast 201, South 202, Midwest 203, and West 204. In this embodiment, a user can drill down onto a custom region to see more detail for that region, such as any sub-regions. For example, a user can select a region in order to highlight that region, and to display each of the states or sub-regions included within that region and their labels. As illustrated in the example of FIG. 2d, West region 204 has been selected and, therefore, is highlighted and elevated to show each of the states included within the West region 204. In one embodiment, each of the states can be labeled with their two letter abbreviation and can also be displayed in different colors.

Figure 2E:
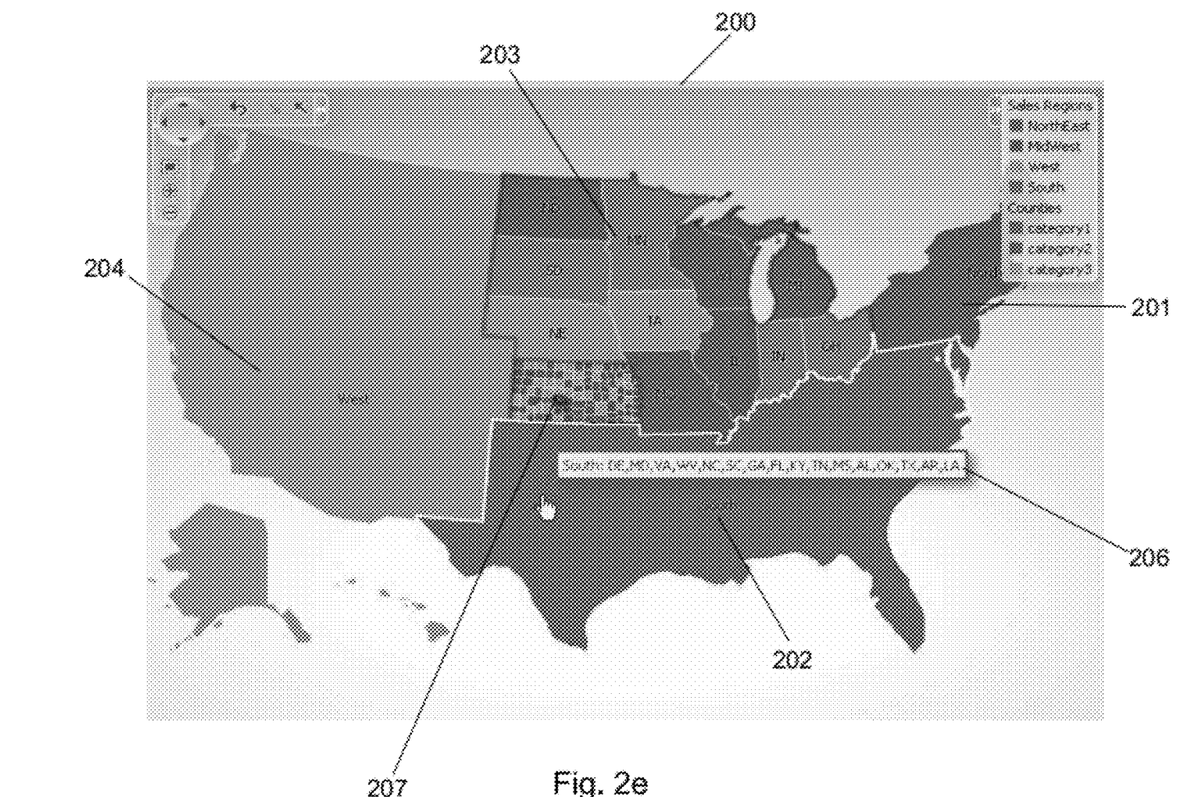
FIG. 2e illustrates an example of an interactive map according to another embodiment.

FIG. 2e illustrates another example of a map 200 with the four custom regions, Northeast 201, South 202, Midwest 203, and West 204. In this example, tooltip 206 lists the states in the South region 202. Further, as illustrated in FIG. 2e, the Midwest region 203 is drilled down to show the states in the Midwest region 203 and their labels. In addition, the state of Kansas (KS) is further drilled down to display each of the counties 207 in that state.

Figure 3:
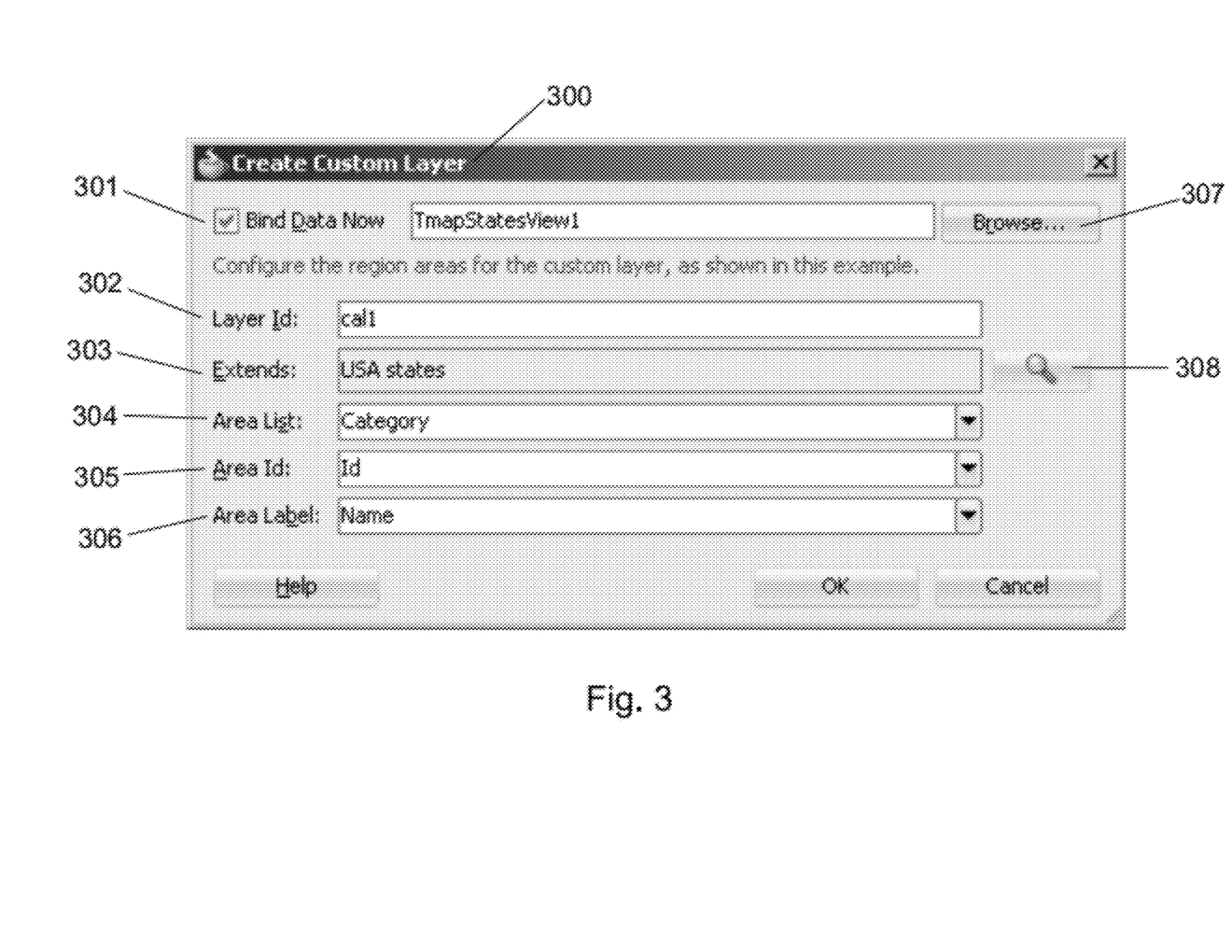
FIG. 3 illustrates a user interface according to one embodiment.

FIG. 3 illustrates an example of a create custom layer dialog user interface 300 for creating a custom region layer. The create custom layer dialog user interface 300 includes a bind data now section 301 in which a user can select the browse button 307 to select the data collection to be used to data bind the custom layer and areas. Layer ID section 302 is used to enter a unique identifier for a customAreaLayer component. For example, if the U.S. map is divided into aggregate regions of Northeast, Midwest, West, and South, then they might be defined with corresponding IDs of NE, MW, W, and S.

In the extends section 303 of create custom layer dialog user interface 300, search icon 308 can be used to display the built-in map layers that can be used to aggregate areas for the custom layer. Then, the map layer that the custom layer will extend is selected. Area List section 304 provides a drop down list to select the data collection attribute representing the list of lower level map regions that are used to aggregate the areas in the custom map layer. Area ID section 305 uses a drop down list to select the data collection attribute representing the unique identifier of lower level map regions that are used to aggregate the areas in the custom map layer. Area Label section 306 uses a drop down list to select the data collection attribute representing the names of lower level map regions that are used to aggregate the areas in the custom map layer. After creating a custom layer using, for example, create custom layer dialog user interface 300, the custom layer can be added to the map layer hierarchy and used in the same way as a built-in map layer.

Below is an example of computer program pseudo-code that may be used to configure and/or add a custom layer to the map layer, according to an embodiment:

```
<dvt:thematicMap>
...
<dvt:areaLayer layer="states" id="all"/>
<dvt:areaLayer layer="call" id="al3"/>
<dvt:customAreaLayer id="call"
        Value="#{bindings.TmapStatesView.collectionModel}"
        Var="row"
        extendsLayer="states">
  <dvt:customArea areaID="#{row.RowID}" areaList="#{row.RowID}"
        label="#{row.RowID}" id="cal"/>
 <dvt:customAreaLayer>
...
<dvt:thematicMap>
```

The following is an example of computer program pseudo-code for using a custom layer in a thematic map, according to an embodiment:

```
<dvt:thematicMap id="thematicMap" image Format="flash"
basemap="usa" drilling="on"
        maintainDrill="true"
        controlPanelBehavior="initExpanded"
        summary="US Custom Regions">
 <dvt:customAreaLayer id="cr11"
value="#{tmapRegions.collectionModel}" var="row"
        varStatus="rowStatus"
        extendsLayer="states">
  <dvt:customArea areaID="#{row.name}" label="#{row.name}"
        areaList="#{row.regions}" id="ca1"/>
 </dvt:customAreaLayer>
 <dvt:areaLayer id="custom" layer="cr11">
  <dvt:areaDataLayer contentDelivery="immediate"
        Value="#{tmapRegions.collectionModel}"
        selectionMode="single"
        var="row" varStatus="rowStatus" id="ad11">
   <dvt:areaLocation name="#{row.name}" id="al1">
    <dvt:area fillColor="#{row.color}" shortDesc="#{row.regions}"
        Id="a1" value="#{row.name}"/>
   </dvt:areaLocation>
  </dvt:areaDataLayer>
 <dvt:areaLayer>
 <dvt:areaLayer id="areaLayerS" layer="states">
   <dvt:areaDataLayer id="dataLayerS" selectionMode="multiple"
        contentDelivery="immediate"
        value="#{tmapStates.collectionModel}" var="row"
        varStatus="rowStatus">
    <dvt:areaLocation id="areaLocS" name="#{row.name}">
     <dvt:area id="area1S" fillColor="#{row.color}"></dvt:area>
    </dvt:areaLocation>
   </dvt:areaDataLayer>
 </dvt:areaLayer>
 <dvt:areaLayer id="areaLayer" layer="counties">
   <dvt:areaDataLayer id="dataLayer" selectionMode="single"
        contentDelivery="immediate"
        value="#{tmapCounty.collectionModel}" var="row"
        varStatus="rowStatus">
    <dvt:areaLocation id="areaLoc" name="#{row.name}">
```

-continued

```
     <dvt:area id="area1" fillColor="#{row.color}"
        Value="#{row.category}"></dvt:area>
    </dvt:areaLocation>
   </dvt:areaDataLayer>
 </dvt:areaLayer>
 <dvt:legend label="Sales Regions" id="l1">
   <dvt:legendSection source="custom:ad11:al" id="ls1"/>
   <dvt:legendSection label="Counties" source="
        areaLayer:dataLayer:areaLoc" Id="ls3"/>
 </dvt:legend>
</dvt:thematicMap>
```

Figure 4:
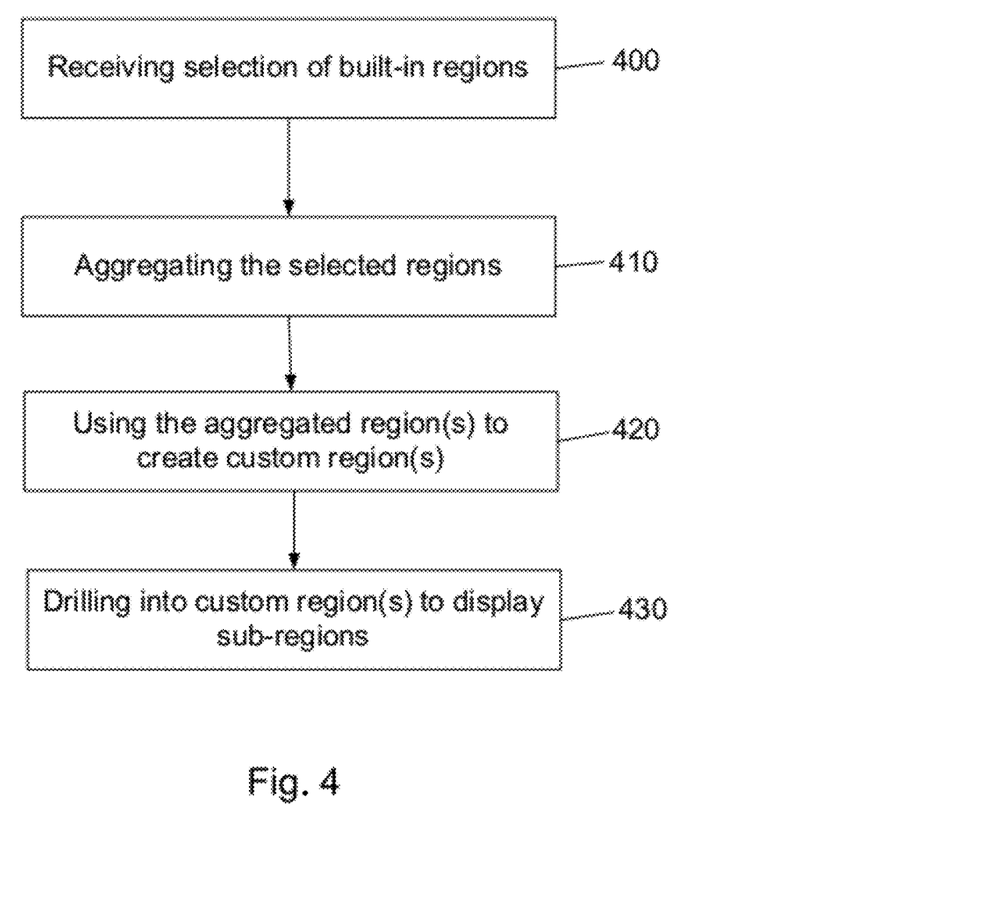
FIG. 4 illustrates a flow diagram of a method according to an embodiment.

FIG. 4 illustrates a flow diagram of a method for creating interactive custom regions, according to one embodiment. In certain embodiments, the functionality of the flow diagram of FIG. 4, is implemented by software stored in memory or other computer readable or tangible media, and executed by a processor. In other embodiments, the functionality may be performed by hardware (e.g., through the use of an application specific integrated circuit (ASIC), a programmable gate array (PGA), a field programmable gate array (FPGA), etc.), or any combination of hardware and software.

Referring to FIG. 4, the method includes, at 400, receiving a selection of built-in interactive regions provided by a visualization component. In certain embodiments, the selection may be submitted by a user and received by the custom visualization component module 16 of system 10 illustrated in FIG. 1. The method then includes, at 410, aggregating the selected set of regions. As discussed above, the set of regions may be aggregated according to a data collection attribute representing the unique identifier of lower level map regions. At 420, the method includes creating one or more custom regions from the aggregation of the selected set of regions. The method may further include, at 430, drilling into the custom region(s) in order to display the individual sub-regions that were aggregated to make up the custom region(s).

In certain embodiments, a Java class may be used to implement some aspects of the method illustrated in FIG. 4, such as the aggregating of the selected set of regions. For example, using a Java class called "java.awt.geom.Area," a new path can be created as follows: GeneralPath path=new GeneralPath( ) Then, the entire region is looped through and appended to the path, for example, as follows:

```
for (int i=0; i < regions.length; i++)
  {
     path.append (regions[i]);
  }
```

Next, an Area with the path is created as follows: Area a=new Area(path). Area a will now have the combined region.

Accordingly embodiments of the invention provide a computer implemented method that can be executed by a processor. The method may include receiving a selection of built-in interactive regions provided by a visualization component, aggregating the selected set of regions, and creating one or more custom regions from the aggregation of the selected set of regions. As a result, application developers are now able to extend the built-in regions provided by a visualization component by creating these custom regions. Previously, developers were limited to working with only the regions provided by the visualization component. As such, users could not see visual effects applied to a region, such as sales volume, success rates, etc., which would enable better decision making.

It should be noted that many of the functional features described in this specification have been presented as modules, applications or the like, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code or algorithm could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to:
    display a lower level geographic region layer, including a plurality of selectable lower level geographic regions, to a user, each lower level geographic region including a border defining a geographic boundary;
    receive selections of lower level geographic regions from the user, each selection including at least a plurality of lower level geographic regions having adjacent borders;
    aggregate the selections of lower level geographic regions into a plurality of higher level interactive custom geographic regions;
    display a custom geographic region layer, including the plurality of custom geographic regions, to the user;
    receive a selection of a custom geographic region from the user;
    display the selected custom geographic region by highlighting and elevating the selected custom geographic region with respect to the unselected custom geographic regions, each of the plurality of lower level geographic regions that form the selected custom geographic region being displayed at the same elevation; and
    display the lower level geographic regions of the selected custom geographic region within a border of the selected custom geographic region, or list the names of the lower level geographic regions of the selected custom geographic region within a tool tip disposed over the selected custom geographic region.

2. The computer readable medium according to claim 1, wherein the aggregating comprises combining each selection of lower level geographic regions into a custom region.

3. The computer readable medium according to claim 1, wherein at least one custom geographic region functions in a same manner as the lower level geographic regions.

4. The computer readable medium according to claim 1, wherein at least one custom geographic region is used to display data.

5. The computer readable medium according to claim 1, wherein at least one custom geographic region is used to display markers and images.

6. The computer readable medium according to claim 1, wherein the aggregating comprises aggregating according to a data collection attribute.

7. The computer readable medium according to claim 1, wherein the instructions further cause the processor to drill into a custom geographic region to display individual lower level geographic regions that make up the custom geographic region.

8. The computer readable medium according to claim 1, wherein the lower level geographic region layer includes states and counties, and the custom geographic region layer includes Northeast, Midwest, West, and South custom geographic regions.

9. A method for creating interactive custom geographic regions, the method comprising:
    displaying a lower level geographic region layer, including a plurality of selectable lower level geographic regions, to a user, each lower level geographic region including a border defining a geographic boundary;
    receiving, at a visualization component, selections of lower level geographic regions from the user, each selection including at least a plurality of lower level geographic regions having adjacent borders;
    aggregating the selections of lower level geographic regions into a plurality of higher level interactive custom geographic regions;
    displaying a custom geographic region layer, including the plurality of custom geographic regions, to the user;
    receiving, at the visualization component, a selection of a custom geographic region from the user;
    displaying the selected custom geographic region by highlighting and elevating the selected custom geographic region with respect to the unselected custom geographic regions, each of the plurality of lower level geographic regions that form the selected custom geographic region being displayed at the same elevation; and
    displaying the lower level geographic regions of the selected custom geographic region within a border of the selected custom geographic region, or listing the names of the lower level geographic regions of the selected custom geographic region within a tool tip disposed over the selected custom geographic region.

10. The method according to claim 9, wherein the aggregating comprises combining each selection of lower level geographic regions into a custom geographic region.

11. The method according to claim 9, wherein at least one custom geographic region is used to display data.

12. The method according to claim 9, wherein at least one custom geographic region is used to display markers and images.

13. The method according to claim 9, wherein the aggregating comprises aggregating according to a data collection attribute.

14. The method according to claim 9, wherein the lower level geographic region layer includes states and counties, and the custom geographic region layer includes Northeast, Midwest, West, and South custom geographic regions.

15. An apparatus, comprising:
a processor; and
a memory, coupled to the processor, storing a custom visualization component module that, when executed by the processor, creates interactive custom geographic regions, the creating comprising:
displaying a lower level geographic region layer, including a plurality of selectable lower level geographic regions, to a user, each lower level geographic region including a border defining a geographic boundary;
receiving selections of lower level geographic regions from the user, each selection including at least a plurality of lower level geographic regions having adjacent borders;
aggregating the selections of lower level geographic regions into a plurality of higher level interactive custom geographic regions;
displaying a custom geographic region layer, including the plurality of custom geographic regions, to the user;
receiving a selection of a custom geographic region from the user;
displaying the selected custom geographic region by highlighting and elevating the selected geographic region with respect to the unselected custom geographic regions, each of the plurality of lower level geographic regions that form the selected custom geographic region being displayed at the same elevation; and
displaying the lower level geographic regions of the selected custom geographic region within a border of the selected custom geographic region, or listing the names of the lower level geographic regions of the selected custom geographic region within a tool tip disposed over the selected custom geographic region.

16. The apparatus according to claim 15, wherein the custom visualization component module is configured to combine each selection of lower level geographic regions into a custom geographic region.

17. The apparatus according to claim 15, wherein at least one custom geographic region functions as the lower level geographic regions.

18. The apparatus according to claim 15, wherein at least one custom geographic region is used to display data.

19. The apparatus according to claim 15, wherein at least one custom geographic region is used to display markers and images.

20. The apparatus according to claim 15, wherein the custom visualization component module is configured to aggregate the selections of lower level geographic regions according to a data collection attribute.

21. The apparatus according to claim 15, wherein the lower level geographic region layer includes states and counties, and the custom geographic region layer includes Northeast, Midwest, West, and South custom geographic regions.

* * * * *

UNITED STATES PATENT AND TRADEMARK OFFICE
CERTIFICATE OF CORRECTION

PATENT NO. : 9,437,120 B2  
APPLICATION NO. : 13/297642  
DATED : September 6, 2016  
INVENTOR(S) : Chow et al.

Page 1 of 1

It is certified that error appears in the above-identified patent and that said Letters Patent is hereby corrected as shown below:

In the Specification

In Column 6, Line 44, after "GeneralPath( )" insert -- . --.

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*